Dec. 26, 1944. J. C. McCUNE 2,366,044

VALVE DEVICE

Original Filed April 30, 1943  3 Sheets-Sheet 1

INVENTOR
Joseph C. McCune
BY
ATTORNEY

Dec. 26, 1944.  J. C. McCUNE  2,366,044
VALVE DEVICE
Original Filed April 30, 1943   3 Sheets-Sheet 2

INVENTOR
Joseph C. McCune
BY
ATTORNEY

Dec. 26, 1944.  J. C. McCUNE  2,366,044
VALVE DEVICE
Original Filed April 30, 1943    3 Sheets-Sheet 3

INVENTOR
Joseph C. McCune
BY
ATTORNEY

Patented Dec. 26, 1944

2,366,044

UNITED STATES PATENT OFFICE 2,366,044

VALVE DEVICE

Joseph C. McCune, Edgewood, Pa., assignor to The Westinghouse Air Brake Company, Wilmerding, Pa., a corporation of Pennsylvania Original application April 30, 1943, Serial No. 485,130. Divided and this application February 24, 1944, Serial No. 523,650

4 Claims. (Cl. 303—69)

This invention relates to valve devices and has particular relation to valve devices suitable for use in connection with apparatus for detecting the slipping condition of the wheels of vehicles such as railway cars and trains, for the purpose of controlling the pressure in the brake cylinders of the fluid pressure brake system on the vehicle in a manner to prevent sliding of the wheels. The present application is a division of my prior copending application Serial No. 485,130, filed April 30, 1943, and assigned to the same assignee as is the present application.

The term "sliding," as employed herein in connection with car wheels, refers to the locked or non-rotative condition of the wheels caused by excessive braking with relation to the adhesion between the wheels and the track rails at a time when the car is in motion. The term "slipping" or "slipping condition," as employed herein in connection with car wheels, refers to the rotation of the car wheels at a speed different from that corresponding to vehicle speed at a given instant. During a slipping condition, the rotational speed of the wheel may exceed that corresponding to vehicle speed or it may be less than that corresponding to vehicle speed, depending upon whether the condition is induced by excessive propulsion torque or excessive braking torque respectively.

It is well known that whenever a vehicle wheel, such as a railway car wheel, exceeds a certain rate of rotative deceleration, such as that corresponding to a rate of retardation of the car of ten miles per hour per second, it is a positive indication that the wheel is in a slipping condition.

Various devices of an electrical or mechanical nature have been devised and employed for recognizing the slipping condition of a car wheel on the basis of the rate of deceleration of the wheels during a slipping condition. One of such mechanical devices is of the rotary inertia type comprising a fly-wheel that is so constructed and arranged as to shift rotatively relative to a vehicle wheel in a leading direction to a degree varying substantially proportionally to the rate of deceleration of the wheels.

Various types of valve devices have been proposed and employed in connection with wheel-slip detecting devices for the purpose of rapidly reducing the pressure in the brake cylinder associated with a wheel that begins to slip to prevent sliding thereof, and for subsequently restoring the pressure therein after the slipping wheel returns to a speed corresponding to vehicle speed.

It has been demonstrated that if the pressure in a brake cylinder is reduced promptly and rapidly at the time that a wheel begins to slip, the wheel will cease to decelerate and accelerate back toward a speed corresponding to vehicle speed without actually reducing sufficiently in speed to attain a locked or sliding condition.

My present invention is accordingly concerned with a novel type of valve device for effecting a reduction of the pressure in the brake cylinder associated with a slipping vehicle wheel, and characterized in that it insures the reduction of the pressure in the brake cylinder to below a certain value before permitting the restoration of the supply of fluid under pressure back to the brake cylinder and the consequent re-application of the brakes.

The principle of controlling the pressure of fluid in the brake cylinder so as to cause it to be reduced below a certain value before permitting the resupply of fluid to the brake cylinder under the control of wheel-slip detecting devices has been previously proposed and disclosed in prior patents such as, for example, Patent 2,198,029 and Patent 2,198,030 to Clyde C. Farmer.

It is an object of my present invention, however, to provide a suitable valve device which may be pneumatically controlled and automatically effective in response to a momentary pneumatic control impulse for the purpose of effecting the reduction of pressure in a fluid pressure receiving device to below a certain pressure before restoring the supply communication to the device.

The above object, and other objects of my invention which will be made apparent hereinafter, are attained in an embodiment of my invention described hereinafter and illustrated in connection with associated fluid pressure brake control and wheel-slip detecting apparatus in the accompanying drawings wherein.

Description

While the valve device comprising my present invention has utility in connection with other situations, it is designed for and intended for use principally in connection with fluid pressure operated brakes for railway cars and trains. It will be understood further that my novel valve device is intended to be utilized and operated in connection particularly with that type of fluid pressure brake equipment for railway cars commonly referred to as the "HSC" equipment for high speed trains. For simplicity, I have, however, disclosed in the drawings a simplified fluid pressure brake control apparatus of the straight air type including a train pipe 11 made up of longitudinal sections on each car of the train connected from car to car by the usual hose couplings 12, a brake valve 13 of the self-lapping type for controlling the pressure in the pipe 11 which will be hereinafter referred to as the control pipe, and a reservoir 14 normally charged with fluid under pressure, as by a fluid compresser not shown, and constituting the source of fluid pressure.

The brake valve 13 is of the well known self-lapping type having self-lapping valve mechanism including a rotary operating shaft on which is an operating handle 13a for rotating the shaft to different operative positions. The handle 13a has a normal brake release position in which control pipe 11 is vented to atmosphere through a branch pipe 15 and an exhaust port and pipe 16. When the brake valve handle 13a is shifted out of the brake release position in one direction into an application zone, the valve mechanism of the brake valve is operated to cause fluid under pressure to be supplied from the reservoir 14 through the pipe 15 to charge the control pipe 11 to a pressure corresponding substantially to the degree of displacement of the brake valve handle 13a out of its brake release position. If the pressure in the control pipe 11 tends to reduce for any reason, such as leakage or for other reasons hereinafter made apparent, the self-lapping valve mechanism of the brake valve operates automatically to maintain a supply of fluid under pressure from reservoir 14 to the control pipe 11 to maintain a pressure corresponding to the position of the brake valve handle.

Figure 1:
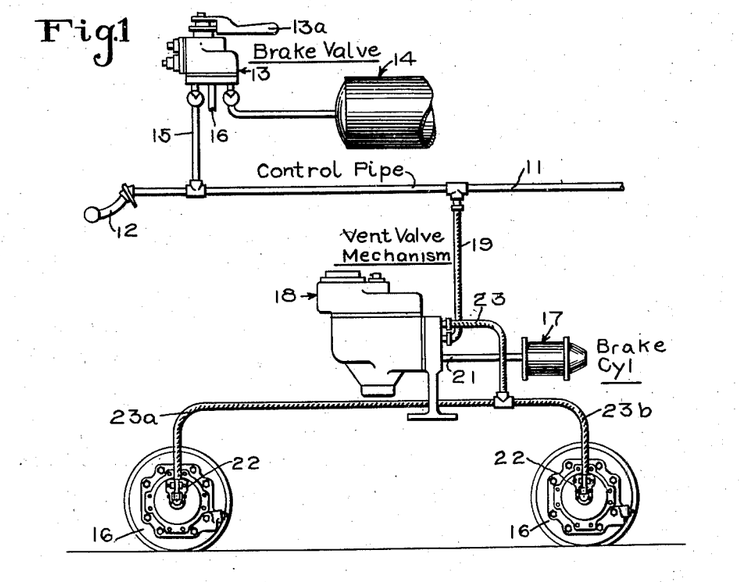
Fig. 1 is a simplified diagrammatic view of a fluid pressure brake control apparatus applied to a single four-wheel truck.

The fluid pressure brake control apparatus is shown in Fig. 1 as applied to a four-wheel car truck having two separately rotating wheel and axle units, one wheel 16 of each unit being shown.

A standard brake cylinder 17 is provided for operating the usual brake shoes, associated with the vehicle wheels 16, through the medium of conventional brake rigging and brake levers, the brakes shoes and brake rigging being omitted from the drawings for simplicity.

According to my invention, a so-called vent valve mechanism 18 is provided for controlling the connection between the control pipe 11 and the brake cylinder 17 in a manner hereinafter more fully explained. Briefly, however, the vent valve mechanism 18 normally provides a communication between a branch conduit or pipe 19 of the control pipe 11, which pipe 19 is indicated as flexible in character, and a pipe 21 hereinafter referred to as the brake cylinder pipe leading to the brake cylinder 17. The pipe or conduit 19 is flexible in character because the control pipe 11 is carried on the body of the car and the vent valve mechanism 18 is carried on the car truck which moves relative to the car body.

The vent valve mechanism 18 is operatively controlled by wheel-slip detecting devices 22 associated with each of the wheel and axle units, respectively, through a flexible pipe or conduit 23 having two branches 23a and 23b leading respectively to the two different wheel-slip detecting devices 22. The pipes or conduits 23, 23a, and 23b are flexible in character in view of the relative movement between the non-spring-supported or "unsprung" wheel and axle units and spring-supported or "sprung" portion of the truck frame carrying the vent valve mechanism 18.

As will be explained more fully hereinafter, whenever either of the wheel-slip detecting devices 22 operates in response to the slipping condition of the corresponding wheel unit, the vent valve mechanism 18 is correspondingly operated to first cut-off the communication between the control pipe 11 and the brake cylinder 17 and then effect a continued, rapid reduction of the pressure in the brake cylinder 17 until the pressure in the brake cylinder 17 reduces below a certain low pressure, such as eight pounds per square inch. The vent valve mechanism 18 thereafter operates automatically to restore the communication between the control pipe 11 and the brake cylinder 17 to effect the resupply of fluid under pressure to the brake cylinder and a consequent re-application of the brakes.

Figure 3:
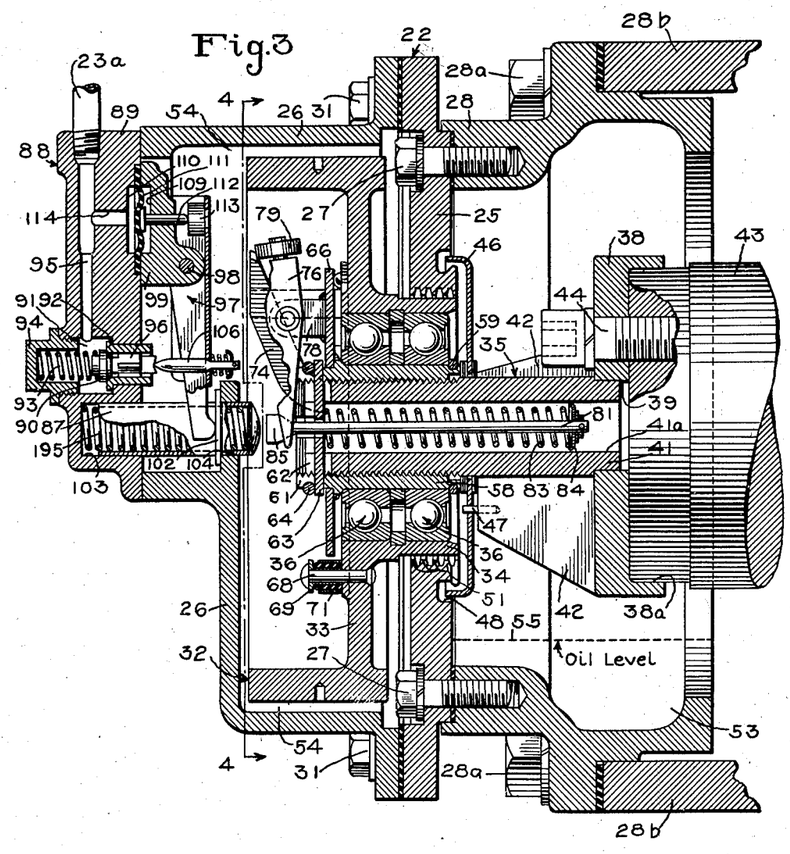
Fig. 3 is an enlarged sectional view showing the construction of the wheel-slip detecting device with which my novel valve mechanism is associated.

Referring to Fig. 3, each wheel slip detecting device or rotary inertia device 22 is mounted within a sectionalized casing comprising an annular end plate 25 and end cover 26. The end plate 25 is secured as by a plurality of screws 27 to the outer end of a removable adapter ring or casing 28 which is in turn, attached as by a plurality of bolts or screws 28a to the outer end of the standard axle journal casing 28b. The end cover 26 is substantially circular in form and is provided with four circumferentially spaced flanges 29 through which a plurality of screws or bolts 31 extend to secure the end cover to the end plate 25 which is of corresponding outer contour.

The rotary inertia device itself comprises an annular inertia ring or fly-wheel 32, the outer rim of which is joined through an intervening web 33 to a central hub 34. Hub 34 is rotatively mounted or journaled on a spindle 35, attached to the end of the axle in the manner more fully described presently, by means of two ball bearing races 36 disposed in axially spaced relation within the hub 34.

The spindle 35 is a fabricated member as shown, but it may be an integral casting if desired. As shown, the spindle 35 comprises a securing flange or disk 38 having a central bore or hole of circular or polygonal contour 39 in which one end of a tubular member 41 is received, and a plurality of angularly spaced supporting webs 42 suitably welded to the tubular member 41 and the disk 38 for maintaining the tubular member 41 in rigid perpendicular relation to the disk 38.

The disk 38 of the spindle 35 is provided with a suitable circular recess 38a on the outer face thereof in which the outer end of the axle 43 is received and is fixed to the axle by a plurality of screws 44 extending through suitable holes in the disk into registering tapped holes in the end of the axle. The spindle 35 thus rotates with the axle 43, the tubular member 41 of the spindle being in coaxial relation to the axle.

An annular oil-sealing disk 46 having a central hole therein is fitted over the tubular member 41 of the spindle 35 and secured, as by a pin 47 extending therethrough into one or more of the webs 42, for rotation with the spindle. The disk 46 is of shallow dish shape so that the outer rim thereof is cylindrical in form and parallel to the axis of rotation of the tubular member 41 of the spindle. The rim of the oil-sealing disk 46 extends partially into an annular cavity 48 formed in the face of the end plate 25.

The hub 34 of the fly-wheel 32 extends into a central circular opening in the end plate 25, slightly larger in diameter than the outer diameter of the hub 34. In this central opening in the end plate 25 are a plurality of axially spaced annular ribs 51. The ribs 51 function in cooperation with the sealing disk 46 and annular cavity 48 in the end plate 25 as an oil-seal to prevent the entrance of lubricating oil from the chamber 53, within the adapter ring 28 and axle journal casing 28b into the chamber 54 on the opposite side of the end plate 25 containing the fly-wheel 32. This type of oil-seal arrangement is not my invention.

It will be understood that the oil for lubricating the roller bearings supporting the axle 43 in its journal casing 28b extends normally to the level indicated by the broken line 55 within the adapter ring 28. It is necessary, therefore, to prevent the entrance of oil into the chamber 54 in order to prevent an accumulation of oil in chamber 54 to a level such that the lower portion of the fly-wheel 32 would run in oil, inasmuch as this would interfere with the proper operation of the wheel-slip detecting device.

For ease of assembly and disassembly, the inner bearing ring of the bearing races 36 supporting the fly-wheel 32 on spindle 35 has an internally threaded sleeve 57 extending therethrough which screws on the outer threaded portion of the tubular member 41 of spindle 35 to a position clamping the oil-seal ring 46 against the end of the webs 42. Sleeve 57 has an annular shoulder 58 at one end and a snap ring 59 at the other end for holding the sleeve 57 in assembled relation with the bearing races 36.

The fly-wheel 32 is thus installed and removed from the spindle 35 by screwing the sleeve 57 on the threaded portion of the tubular member of the spindle 35 without disturbing or removing the end plate 25. Consequently it is not necessary to drain oil from the axle journal casing in order to remove the fly-wheel for inspection or repair.

Figure 4:
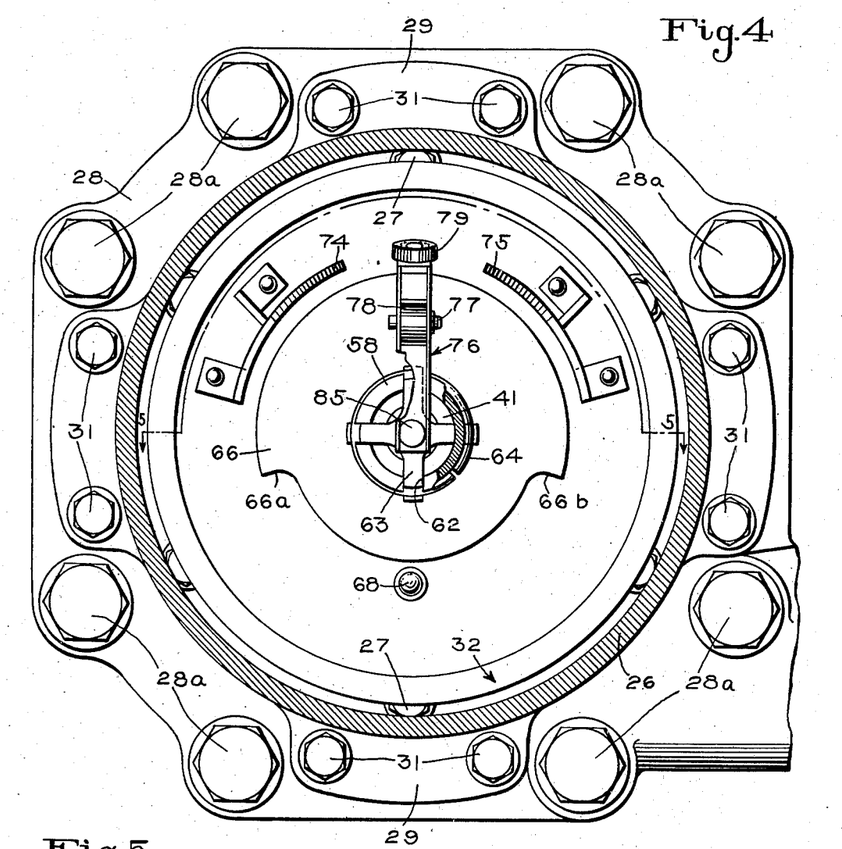
Fig. 4 and Fig. 5 are sectional views, taken on the lines 4—4 and 5—5 respectively of Fig. 3 and Fig. 4, showing further details of the wheel-slip detecting device.

The sleeve 57 has four slots 61 spaced around the end thereof which are adapted to register with correspondingly spaced slots 62 in the end of the tubular portion 41 of the spindle 35, the sleeve 57 being locked on the tubular portion 41 of the spindle 35 by means of a key 63, in the form of a Maltese cross, having four arms adapted to be received in the registering slots 61 and 62. (Fig. 4.) A snap ring 64, cooperating with an annular groove on the outer surface of the sleeve 57, holds the key 63 in position.

A stop disk 66, the purpose of which will be explained presently, having a central hole is secured on the sleeve 57 outside the shoulder 58, as by welding. A portion of the periphery of stop disk 66 is cut away to a reduced radius, thereby providing two angularly spaced stop shoulders 66a and 66b. (Fig. 4.) Secured to the web 33 of the fly-wheel 32 between the shoulders 66a and 66b and in the plane thereof is a stop lug comprising a pin 68 riveted to the web and having a rubber bushing 69 thereon covered by a protecting sheet metal ring 71. The total degree of rotative movement of the fly-wheel 32 with respect to the spindle 35 is thus determined by the amount of rotative movement occurring between the engagement of the stop lug by the shoulder 66a and the engagement of the stop lug by the shoulder 66b.

Figure 5:
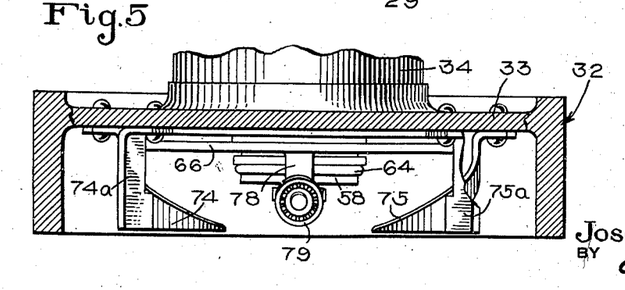

Secured, as by riveting to the web 33 of the fly-wheel 32, are two circumferentially spaced arcuate cams 74 and 75, respectively. The free ends of the cams is rigidly supported against deflection by a bracket 74a or 75a welded thereto and attached as by rivets to the web of the fly-wheel 32. Cooperating with the cams 74 and 75 is an operating lever 76 of channel-shape which is disposed radially with respect to the axis of rotation of spindle 35 and is pivoted at a point between the ends thereof on a pin 77 carried in a lug 78 that is attached to the stop disk 66 as by welding. The outer end of the lever 76 has a roller 79 rotatively mounted thereon for engaging the inner cam surfaces on the cams 74 and 75, as shown particularly in Figs. 3 and 5.

The peripheral or angular spacing between the cams 74 and 75 is such that the fly-wheel rotatively floats normally between the cams through a predetermined angle which is sufficient to cause revolution of the balls of the ball bearing races 36 through at least one complete revolution. This specific arrangement is a particular feature of my invention and its purpose is to uniformally distribute the wear on the balls of the ball bearing races and insure adequate lubrication of the balls to minimize wear on the balls.

The inner end of the pivoted lever 76 terminates adjacent the outer end of the tubular member 41 of spindle 35 substantially at the axis of rotation of spindle 35 and has a hole therein through which a rod 81 extends into the central bore 41a of the tubular member 41. A coil spring 83 contained in the bore 41a in concentric relation to the rod 81 is interposed between the key 63 and a collar 84, fixed on the end of the rod 81, to urge the rod normally in an axial direction toward the axle 43.

The rod 81 has an enlarged portion or head 85 at the end thereof which engages the inner end of the pivoted lever 76 and the length of the rod 81 is such that the pivoted lever 76 is normally pivotally biased to the position determined by the engagement of the lever with the end of the tubular portion 41 of spindle 35, in which the roller 79 is in the alignment with the base of the inclined cam surfaces on the cams 74 and 75, as shown in Fig. 3.

When the fly-wheel 32 shifts rotatively in one direction with respect to the spindle 35 due to deceleration or acceleration of the axle 43, the roller 79 on the lever 76 engages the corresponding one of the cam surfaces on the cams 74 and 75, and depending upon the rate of deceleration or acceleration of the axle 43, is correspondingly pivoted in a right-hand direction as seen in Fig. 3 in opposition to the force of spring 83, which is correspondingly compressed.

The spring 83 is so designed that unless the axle 43 rotatively decelerates at a rate exceeding a certain rate, corresponding to a rate of retardation of the car of ten miles per hour per second, the plunger or rod 81 is not shifted appreciably in the left-hand direction by the pivotal movement of the lever 76. In view of the fact, previously explained, that a car wheel does not attain a rate of deceleration, corresponding to a rate of retardation of the car of ten miles per hour per second, unless the wheel is actually slipping, it will be seen that the rod 81 is not shifted appreciably in the left-hand direction out of the position shown unless the wheels fixed on the axle 43 are actually slipping.

If the axle 43 rotatively decelerates at a rate exceeding that corresponding to a retardation of the car of ten miles per hour per second, the rod 81 is shifted sufficiently in the left-hand direction out of the normal position shown to engage the operating plunger 87 of a pilot valve device 88 embodied in a casing section 89 attached to the outer face of the casing section 26, which pilot valve device will now be described.

Essentially, the pilot valve device 88 comprises a poppet valve 90 contained in a chamber 91 and urged into seated relation on a seat bushing 92 by a coil spring 93 interposed between the valve and a screw plug 94 closing the opening of the chamber 91 to the exterior of the casing.

A passage 95 is open at one end to the chamber 91 and at the opposite end to the exterior of the casing 89. The corresponding pipe 23a or 23b leading from the vent valve mechanism 18 is connected to the outer end of the passage 95, as by a screw connection.

The valve 90 has a fluted stem 96 that is guided in the seat bushing 92 and projects into the chamber 54 of the casing section 26.

The valve 90 is unseated by movement of the operating plunger 87 through an intervening lever 97. The lever 97 is of channel shape and is pivotally mounted between the ends thereof on a pin 98 supported in a bracket member 99 that is attached to the inner face of the casing section 89, as by screws not shown.

A portion of the web of the lever 97 is cut away and the side flanges spread apart to form a yoke that straddles the plunger 87 which is tubular in form. The ends of the yoke arms or side flanges of the lever 97 are suitably rounded to form substantially a point contact with the side surface of a radially extending collar 102 formed on or attached to the external surface of the plunger 87.

The plunger 87 is slidably supported at one end in a bore 103 in the casing section 89 and at the opposite end in a hole 104 in a portion of the wall of the casing section 26, the longitudinal axis of the plunger coinciding with the axis of rotation of axle 43 and the axis of rod 81. The inner end of the plunger 87 projects into the chamber 54 and is closed to provide a rounded contact head. A coil spring 105 contained within the tubular plunger 87 and interposed between the closed end thereof and the casing section 89 normally yieldingly biases the plunger in the right-hand direction to a position determined by the engagement of the collar 102 with the casing section 26. In this position the inner rounded contact end of the plunger 87 has a slight clearance with respect to the head 85 on the operating rod 81.

A toggle pin 106, secured to the web of the lever 97, has a pointed end engaged in a conical recess on the inner end of the fluted stem of the valve 90 and is thus effective to transmit the force exerted by the lever 97 to the valve 90 to effect unseating thereof. The toggle pin adjusts itself automatically to the angular position of the lever 97 so that the force exerted by the lever to unseat the valve 90 is always in a straight line coincident with the axis of the fluted stem of the valve. Consequently, there is no tendency at any time to cause cocking of the valve 90 on its seat and unintended and undesired leakage of fluid under pressure past the valve 90 from the passage 95 is thus prevented.

In order to balance the force of the fluid pressure in the passage 95 urging the valve 90 to its seated position and resisting the unseating thereof, a movable abutment shown as a flexible diaphragm 111 is provided for exerting a counterbalancing or balancing effect. This abutment may take the form of a piston, if desired. The diaphragm shown is of suitable flexible rubber and is clamped around the periphery thereof between the bracket member 99 and the casing section 89. Two cavities or chambers 109 and 110, preferably circular in cross-section, are provided in the bracket member 99 and the casing section 89 on opposite sides of the diaphragm 111, the chamber 110 communicating with the passage 95 through a branch passage 114 so that the diaphragm is subject on one face thereof to the pressure of the fluid in the passage 95 moving it in a right-hand direction.

A follower pin 112 is loosely guided in the bracket 99 in perpendicular relation to the center of the diaphragm, a suitable head on the pin engaging the face of the diaphragm within the chamber 109. Chamber 109 is thus connected to atmosphere and the corresponding face of diaphragm 111 open to chamber 109 is thus always subject to atmospheric pressure. The end of the follower pin 112 is suitably rounded for engaging a contact lug 113 attached, as by welding, to the web of the lever 97 at a point on the opposite side of the fulcrum pin 98 relative to the toggle pin 106.

It will accordingly be seen that the force exerted on the lever 97 by the fluid pressure acting on the diaphragm 111 urges the lever in a clockwise direction and in opposition to the force of spring 93 and of the fluid pressure in chamber 91 holding the valve 90 seated. The arrangement is such that the effective force exerted by the diaphragm to unseat valve 90 is slightly less than the fluid pressure force and the force of the spring 93 holding the valve 90 seated.

By reason of the arrangement above described, it will be apparent that a relatively light force is required to rock the pivoted lever 97 in a clockwise direction to effect unseating of the valve 90. This is desirable because of the magnitude of the forces available to shift the operating rod 81 in a left-hand direction. Moreover, it is intended that the position of the operating rod 81 accurately reflects the rate of change of rotational speed of the axle 43. It is desirable, therefore, to avoid adding a substantial resisting force to the displacement of the operating rod 81 in the left-hand direction for the reason that such resisting force would prevent the rod 81 assuming a position corresponding to the rate of change of speed of the axle 43.

It is furthermore desirable that the valve 90 be unseated promptly in response to a rate of rotative deceleration of the axle 43 reflecting a wheel-slip condition. Consequently, it is desirable that the force required to unseat the valve 90 be relatively small so as not to delay the unseating of the valve 90 in response to a wheel-slip condition.

The chamber 54 in the casing section 26 is at atmospheric pressure by reason of the connection to atmosphere through the axle journal casing 28b. It follows therefore that when the valve 90 is unseated, it vents fluid under pressure from passage 95 to atmosphere at a rapid rate. As will be apparent from subsequent description, such rapid venting of the fluid under pressure in the passage 95 initiates a responsive operation of the vent valve mechanism 18.

Figure 2:
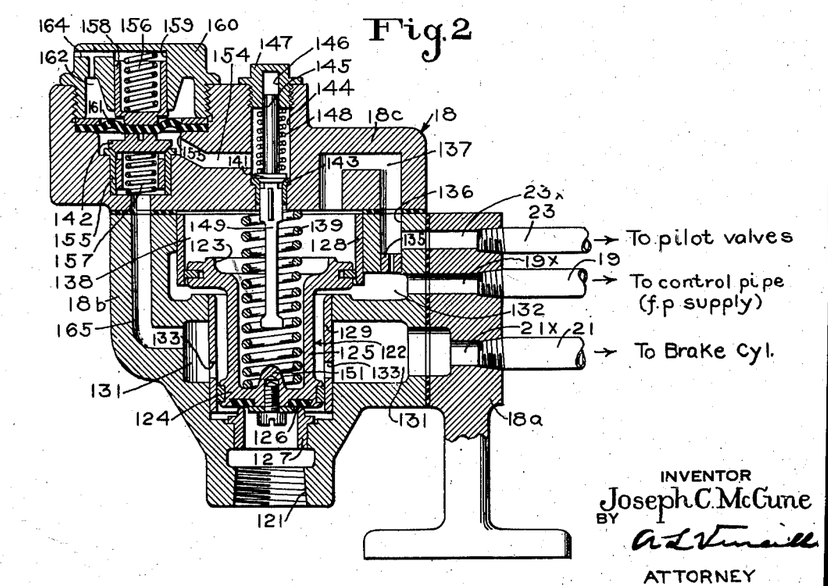
Fig. 2 is an enlarged sectional view illustrating the improved valve mechanism comprising my present invention and employed in the apparatus shown in Fig. 1.

The vent valve mechanism 18 comprises a casing having a pipe bracket and mounting section 18a, a body section 18b, and a cap section 18c, the sections being secured together as shown in Fig. 2 by suitable screws not visible in the drawings sealing gaskets being provided at the contact faces of the sections.

The pipe bracket section 18a is provided with three ports or passages 19x, 21x, and 23x, having tapped openings for receiving the threaded ends of the correspondingly numbered pipes or conduits 19, 21, and 23 shown in Fig. 1.

The body section 18b has a lower conical portion in which is a large vent port 121 which is controlled by a differential piston valve 122.

The differential piston valve 122 comprises an annular piston 123 and a relatively smaller piston 124, the two pistons being connected by a tubular stem 125. The outer face of the piston 124 is provided with an annular gasket 126 that engages an annular rib seat formed on a seat bushing 127 fixed in the casing section 89b at the vent port 121.

The piston 123 operates in a bushing 128 fixed in the casing and the piston 124 operates in a bushing 129 fixed in the casing.

The bushing 129 extends through a chamber 131 in the casing section 18b out of which the port 21x opens. The interior of the bushing 129 is open at the upper end thereof to a chamber 132 out of which the port 19x opens.

A plurality of ports 133 in the bushing 129 provides communication between the chamber 132 and the chamber 131 when the piston 124 of the piston valve 122 is seated on the seat bushing 127. It will thus be apparent that when the control pipe 11 in Fig. 1 is charged with fluid under pressure, such fluid under pressure flows through the pipe 19 and port 19x, into the chamber 132 where it acts on the lower face of the annular piston 123, thence through the ports 133 to the chamber 131, and through port 21x and pipe 21 to the brake cylinder 17.

At the same time, fluid under pressure from chamber 132 flows through a choke 135 having a restricted orifice into a passage 136, the passage 136 being open to the port 23x and also connected to a cavity or passage 137 in the cap section 18c that leads to the chamber 138 formed within the bushing 128 above the piston 123.

A coil spring 139, contained in the tubular stem 125, is interposed between the face of cap section 18c and the inner face of piston 124 for urging the piston 124 into seated position on the seat bushing 127 in opposition to the force of the fluid pressure in chamber 132 exerted upwardly on the lower face of the piston 123.

When fluid under pressure, supplied through the pipe 23 and branch pipes 23a and 23b to the pilot valve devices 88 of the several wheel-slip detecting devices 22, is vented at a rapid rate by operation of the pilot devices 88 in the manner heretofore described, the reduction of pressure in the chamber 138 above the piston 123 produces a differential fluid pressure on the piston 123 such that the piston 123 is urged upwardly in opposition to the yielding force of the spring 139 into seated engagement on the open portion of the contact face of the cap section 18c.

In such position of the piston valve 122, the piston 124 is shifted to a position above the ports 133, thereby cutting off the communication between the chamber 132 and chamber 131 and consequently, the supply of fluid under pressure from the control pipe 11 to the brake cylinder 17. At the same time, with the piston 124 thus unseated from the seat bushing 127, the chamber 131 and the connected brake cylinder 17 are connected to atmosphere through ports 133 and the exhaust port 121 so that fluid under pressure is rapidly exhausted from the brake cylinder 17.

In order to maintain piston valve 122 in its uppermost position, in which fluid under pressure is vented from the brake cylinder 17, until the pressure in the brake cylinder reduces below a certain low pressure such as eight pounds per square inch, an arrangement is provided for continuing the reduction of the pressure in the chamber 138 in accordance with the reduction of the pressure in the brake cylinder 17. This arrangement comprises a poppet valve 141 and a control valve 142. The poppet valve 141 seats on a seat bushing 143 fixed in a bore 144 in the cap section 18c and has a cylindrical guiding stem 145 that is slidably received in a bore 146 in a screw plug 147 closing the open end of the bore 144. A coil spring 148 interposed between the screw plug 147 and the valve 141 yieldingly biases the valve into seated position on the seat bushing 143.

Extending from the valve 141 on the side opposite the guide stem 145 is a fluted stem 149, the lower end of which is adapted to be engaged by a boss 151 on the inner face of the piston 124 when the piston valve 122 is raised to its uppermost position. In the uppermost position of the piston valve 122, the position of the piston 124 is such as to effect unseating of the poppet valve 141.

The control valve 142 is contained in a chamber 153 that is connected through a passage 154 to the bore 144, containing the poppet valve 141, and is seated normally downwardly on a seat bushing 155 by a spring 156 in opposition to a spring 157 tending to unseat the valve. The spring 156 acts on a cylindrical follower 158 slidable in a bore 159 of a screw plug 160 screwed into the cap section 18c, the follower in turn engaging the upper face of an imperforate flexible diaphragm 161 clamped around the periphery thereof in the cap section 18c by the screw plug 160.

The screw plug 160 is provided with an annular cavity or chamber 162 open to the upper face of the diaphragm 161 and constantly open to atmosphere through an exhaust port 164.

When the poppet valve 141 is unseated upwardly by the piston valve 122 it causes the chamber 138 to be connected through the bore 144 and passage 154 to the chamber 153 at the lower side of the diaphragm 161. Assuming sufficient fluid pressure in the brake cylinder 17, control valve 142 will have been unseated by the brake cylinder pressure acting on the inner seated area thereof in opposition to the force of spring 156. With chamber 153 thus charged with fluid at the same pressure as in the brake cylinder the force of spring 156 is thus nullified and the spring 157 is effective to hold the control valve 142 unseated upwardly from its seat bushing 155. With the valves 141 and 142 thus unseated, chamber 138 is connected through the passage 165 to the chamber 131, thereby causing the fluid pressure in the chamber 138 to reduce in accordance with reduction of the pressure in the chamber 131 and the connected brake cylinder 17.

The piston valve 122 is thus maintained in its uppermost position by the pressure of the fluid in the chamber 132 acting on the underside of the piston 123 as long as the control valve 142 is unseated. When the fluid pressure in the chamber 153 active on the lower face of the diaphragm 161 reduces to a low value, such as eighteen pounds per square inch, the force exerted by spring 156 becomes effective to reseat the valve 142. With the valve 142 seated, the fluid under pressure supplied through the choke 135 from the supply pipe 19 and chamber 132 results in a build-up of pressure in the chamber 138 assisting the spring 139 and effective to promptly shift the piston valve 122 downwardly to the position wherein the piston 124 is reseated on the seat bushing 127. A certain time interval elapses between the instant control valve 142 is reseated and the instant that piston 124 cuts off the further venting of fluid under pressure from the brake cylinder 17 due to the time required to build-up the pressure in chamber 138 through choke 135 sufficient to shift the piston valve 122 downwardly. During this interval of time, the reduction of brake cylinder pressure continues and at the time piston 124 cuts off further reduction in brake cylinder pressure, the brake cylinder pressure will have reduced further to a value such as eight pounds per square inch. The spring 148 accordingly acts to reseat the poppet valve 141 and is of sufficient strength to maintain it seated in opposition to the pressure of fluid in the chamber 138 acting on its inner seated area.

With the piston valve 122 restored to its normal position shown in Fig. 2, the supply communication between the pipe 19 and the brake cylinder pipe 21 is again established through the ports 133, and the pressure in the brake cylinder is thus again built-up in accordance with the pressure established in the control pipe 11.

Upon restoration of pressure in the brake cylinder 17, control valve 142 is unseated due to the brake cylinder pressure acting in passage 165 on its inner seated area. Chamber 153 is thus charged to a pressure corresponding to brake cylinder pressure and such pressure acting on diaphragm 161 overcomes the force of spring 156 and compresses it upwardly. Spring 157 is thus rendered effective again to hold valve 142 unseated. The fluid pressure from chamber 153 acts in bore 144 to assist in maintaining valve 141 seated.

It will thus be seen that when the pressure of the fluid in the chamber 138 is suddenly reduced by operation of a pilot valve device 88 of either of the wheel-slip detecting devices 22, the pressure of the fluid in the brake cylinder 17 is thereafter automatically first reduced to a predetermined low pressure and then restored to the value corresponding to the pressure established in the control pipe 11.

*Operation*

Let it be assumed that the car having the apparatus shown in Fig. 1 is traveling under power and that the operator desires to apply the brakes to bring the car to a stop. To do so the operator first shuts off the propulsion power and then shifts the brake valve handle 13a out of its brake release position into its application zone an amount corresponding to the desired degree of brake application.

The control pipe 11 is accordingly charged to a pressure corresponding to the position of the brake valve handle in its application zone, such as forty pounds per square inch. At the same time, fluid under pressure from the control pipe 11 flows through the pipe 19, vent valve mechanism 18 and pipe 21 to the brake cylinder 17, the pressure established in the brake cylinder thus corresponding to the pressure established in the control pipe 11. The brakes are accordingly applied to the car wheels 16 to a degree corresponding to the pressure of the fluid in the brake cylinder 17.

As long as the wheels 16 do not slip, the operator may vary the degree of brake application by increasing or decreasing the pressure in the control pipe 11, the pressure in the brake cylinder 17 varying in accordance with the pressure in the control pipe 11 by reason of the normal connection maintained between the branch pipe 19 and the brake cylinder pipe 21 through the vent valve mechanism 18.

If, however, upon application of the brakes in the manner just described, one of the wheel units begins to slip, a further operation occurs which will now be described. When the axle 43 of the slipping wheel unit is rotatively decelerated at the abnormally rapid rate occurring during the slipping condition, the fly-wheel 32 over-runs the spindle 35, and the roller 79 on the lever 76 rides up the inclined surface on the cam 74 or 75 corresponding to the direction of rotation, thereby causing the lever 76 to be rocked so as to shift the rod 81 outwardly to effect unseating of the valve 90 of the pilot valve device 88.

The vent valve mechanism 18 is accordingly operated, in the manner previously described, to cut off the supply of fluid under pressure from the control pipe 11 to the brake cylinder 17 and vent fluid under pressure at a rapid rate from the brake cylinder.

Due to the instantaneous and rapid reduction of the pressure in the brake cylinder 17, the wheels of the slipping wheel unit promptly cease to decelerate and begin to accelerate back toward a speed corresponding to car speed before the speed of the slipping wheels is reduced to zero, and thus before the wheels can become locked and slide.

The rotative acceleration of the axle 43 of the slipping wheel unit at this time is at an abnormally rapid rate corresponding, in order of magnitude, to the abnormally rapid rate of deceleration during the wheel-slip condition. The flywheel 32 accordingly shifts rotatively from a leading to a lagging position with respect to the spindle 35 and axle 43. The roller 79 on the lever 76 thus runs down the inclined cam surface on the cam 74 (or 75) which it engaged during deceleration of the wheel unit and engages and climbs the inclined surface on the other cam 75 (or 74), thus again shifting the rod 81 outwardly in the left-hand direction, as seen in Fig. 3, to again effect unseating of the valve 90 of the pilot valve device 88.

During the interval that the roller 79 on the lever 76 disengages one of the cams 74 or 75 and engages the other, the lever 76 is restored to its normal position by the spring 83 through the medium of the rod 81. With the force of the rod 81 on the plunger 87 thus momentarily removed, the spring 195 restores the plunger 87 momentarily to its normal position, thus permitting the valve 90 to be promptly reseated because of the substantially balanced fluid pressure forces acting on the valve 90 and the diaphragm 111 as applied to the lever 97.

Such momentary closure of the valve 90 is without consequence, however, for the reason that the cycle of operation of the vent valve mechanism 18 is carried through automatically, once it is initiated in response to the initial rapid reduction of the pressure in the control chamber 138 thereof, without regard to the momentary closure of the valve 90 of the pilot valve device 88.

When the wheels of the slipping wheel unit have accelerated fully back to a speed corresponding to car speed, the wheels are again decelerated in accordance with the rate of retardation of the car at the normal low rate, such as four miles per hour per second, depending upon the degree of brake application. In such case, therefore, the fly-wheel 32 again shifts rotatively from a lagging position to a leading position with respect to the axle 43. The lever 76 is thus again restored to its normal position during the interval in which the roller 79 on the lever disengages one of the cams 74 or 75 and engages the other. The valve 90 is thus correspondingly reseated to cut off further venting of fluid under pressure from the passage 95. Moreover, as long as the wheels of the previously slipping unit do not again decelerate at more than the normal rate, the angular displacement of the lever 76 due to cooperation with one or the other of the cams 74 or 75 is insufficient to cause the rod 81 to be moved outwardly enough to effect displacement of the plunger 87 of the pilot valve device in the left-hand direction out of its normal position. Consequently, the valve 90 in the pilot valve device 88 remains seated thereafter until such time as the wheels or wheel units associated with the axle 43 again begin to slip.

Notwithstanding the reseating of the valve 90 of the pilot valve device 88, the piston valve 122 of the vent valve mechanism 18 remains in its uppermost position continuing the reduction of the pressure in the brake cylinder as long as the control valve 142 remains unseated. The rate of supply of fluid under pressure through the choke 135 from the branch pipe 19 of the control pipe is relatively small compared to the rate at which fluid under pressure is vented to atmosphere from the chamber 138 past the valves 141 and 142 and through the exhaust port 121. Consequently, the restoration of the valve 90 of the pilot valve device to its seated position does not in any way interrupt the cycle of operation of the vent valve mechanism 18 once such operation is initiated.

The time that elapses from the instant that a wheel unit begins to slip to the instant that it is restored fully to a speed corresponding to car speed is ordinarily relatively short, being of the order of one and one-half to two seconds. The length of time required for the pressure in the brake cylinder 17 to be reduced from the pressure existing therein at the time slipping of the wheels begins, to the relatively low pressure of eight pounds per square inch, in response to operation of the vent valve mechanism 18, is a variable one which may be longer or shorter than the duration of the slipping condition depending upon the pressure in the brake cylinder at the instant the slipping condition begins.

If the pressure in the brake cylinder 17 is reduced to eight pounds per square inch before the slipping wheel unit attains a speed corresponding to vehicle speed, then the vent valve mechanism 18 will be restored to its normal condition, in which communication is established through which fluid under pressure is resupplied to the brake cylinder, before the slipping wheel unit reaches a speed corresponding to car speed. On the other hand, if the vent valve mechanism 18 is restored to its normal position, in response to the reduction of pressure in the brake cylinder, after the slipping wheels or wheel units have been restored to car speed, then the communication through which fluid under pressure is resupplied to the brake cylinder is not established until such time.

In any event, the resupply of fluid under pressure to the brake cylinder 17 is not effected by the vent valve mechanism 18 until the slipping wheels have been restored at least substantially to a speed corresponding to car speed. In no case, is the degree of reapplication of the brakes due to the resupply of fluid under pressure to the brake cylinder likely to cause sliding of the wheels for the reason that no appreciable degree of brake application is exerted on the wheels while the wheels are at the low point of the speed curve during the slipping cycle.

If the adhesion between the car wheels and the rails is a continuing low value, it is possible that the reapplication of the brakes on car wheels which previously slipped may cause repeated slipping of the same wheels or wheel units. In such case, however, the wheel-slip detector 22 associated with such wheel units operates repeatedly, in the manner previously described, to reduce the degree of application and then increase the degree of application so that at no time are the wheels permitted to become locked and slide.

When fluid under pressure is supplied from the control pipe 11 to the brake cylinder 17 under the control of the vent valve mechanism 18 following a slipping condition of the wheels, the pressure in the control pipe tends to reduce correspondingly. Due to the pressure-maintaining feature of the brake valve 13, however, the pressure in the control pipe 11 is maintained in accordance with the position of the brake valve handle notwithstanding the supply of fluid under pressure from the control pipe to the brake cylinder. If the operator does not effect a change of pressure in the control pipe, therefore, the degree to which the brakes are reapplied on a previously slipping wheel will correspond to that in effect at the time the slipping condition first occurred. Usually, the operator effects a reduction in the degree of application of the brakes by reducing the pressure in the control pipe as the car or train reduces in speed, particularly as it approaches low speed. In such case there is less likelihood that slipping of the wheels will occur upon reapplication of the brakes.

The construction of the wheel-slip detecting devices 22 in such a manner that the fly-wheel 32 is free to shift, unresistedly, relative to the spindle 35 and axle 43 through a predetermined angle determined by the angle through which the roller 79 on the lever 76 moves in shifting from one of the cams, such as cam 74, to the other of the cams is one of the novel features of my present invention. The fact that the fly-wheel 32 is free to float or shift rotatively at all times in unresisted manner through the predetermined angle relative to the axle in the manner just pointed out, causes the individual balls of the ball bearing races 36 to be rotated through at least one complete revolution repeatedly upon slight changes in the rotational speed of the axle 43. As a result, the lubricating grease in the ball bearing races is constantly active between the contacting surface of the balls and the annular ball retaining elements. Wear on the balls is thus minimized. At the same time, due to the revolution of the balls through at least one complete revolution, the wear on the balls of the ball bearing races is evenly distributed so as to prevent the balls from attaining an elliptical or egg-shaped form. Obviously, if the true spherical form of the balls is departed from, the friction in the ball bearing races is increased and the sensitivity and the accuracy of the wheel-slip detecting device as a whole is seriously impaired.

In heretofore known wheel-slip detecting devices of the rotary inertia type, the fly-wheel is yieldingly maintained in a certain normal rotative position relative to the driving spindle or shaft thereof by constantly active resilient means and is shifted yieldingly out of such position to a degree corresponding to the rate of change of speed of the driving spindle. In such case, the total degree of rotative movement of the flywheel relative to the driving spindle is so limited that the fly-wheel bearing elements, whether of the ball or roller type, cannot rotate through at least one complete revolution. Consequently, after a period of time, the balls or rollers are worn unevenly and attain an elliptical or egg-shaped form, thus interfering with the sensitivity and the accuracy of the device.

The arrangement which I have provided serves to prevent the uneven wear on ball elements of the ball bearing races and on roller elements of roller bearing races if such bearing races are employed and thus obviates the need for repair or replacement of the bearing units.

When the car or train comes to a stop in response to a brake application, the brakes remain applied according to the pressure established in the control pipe 11. In order to release the brakes before applying propulsion power to again start the car or train, the operator merely shifts the brake valve handle to its release position to reduce the pressure in the control pipe 11 to atmospheric pressure. The fluid under pressure in the brake cylinder 17 is thus vented to atmosphere by reverse flow back through vent valve mechanism 18, control pipe 11 and the exhaust port of the brake valve to effect the release of the brakes.

Having now described my invention what I claim as new and desire to secure by Letters Patent is:

1. A vent valve mechanism for controlling the supply of fluid under pressure to and the release of fluid under pressure from a fluid pressure receiving device, said mechanism comprising a valve device effective in one position to establish a communication through which fluid under pressure is supplied to the device and effective in a different position to close said supply communication and establish a communication through which fluid under pressure is vented from said device, a control chamber chargeable with fluid under pressure, said valve device being operated in response to a predetermined rate of reduction of the pressure in said chamber from its said one position to its said different position, valve means effective in the said different position of said valve device for establishing communication between said control chamber and said receiving device whereby to cause continued reduction of the pressure in the control chamber in accordance with the reduction of the pressure in the said device, and means responsive to the reduction of the pressure in said fluid pressure receiving device to below a certain value for closing said communication to thereby effect restoration of said valve device to said one position.

2. A vent valve mechanism comprising a valve device effective in one position to establish a communication through which fluid under pressure is supplied to a fluid pressure receiving device and effective in a different position to close said supply communication and establish a communication through which fluid under pressure is vented from the fluid pressure receiving device, a control chamber charged with fluid under pressure upon the supply of fluid under pressure to said fluid pressure receiving device, said valve device being operated in response to the reduction of the pressure in the control chamber at a predetermined rate from said one position to its said different position, valve means effective in the said different position of said valve device for establishing a communication between said control chamber and the fluid pressure receiving device to cause continued reduction of the pressure of the fluid in said control chamber thereafter in accordance with the pressure reduction in said fluid pressure receiving device to maintain said valve device in its said different position, and means responsive to the reduction of the pressure in said fluid pressure receiving device below a certain value for closing said communication to thereby cause recharging of said control chamber to restore said valve device to its said one position.

3. Valve mechanism for controlling the supply of fluid under pressure to and the release of fluid under pressure from a fluid pressure receiving device, said valve mechanism comprising a valve device effective in its normal position to establish a communication through which fluid under pressure is supplied to the device and effective in a different position to close said supply communication and establish a venting communication through which fluid under pressure is vented from said device, a piston for operating said valve device subject on one side to the pressure of fluid being supplied to said device and on the opposite side to fluid at a corresponding pressure, said piston being responsive to a momentary reduction of the pressure on the said opposite side at a rate exceeding a certain rate for operating said valve device from its said normal position to its said different position, a normally seated valve arranged in such a manner as to be unseated by said piston, when it operates the said valve device from its said one to its said different position, and effective when unseated to establish a communication between said opposite side of said piston and said pressure receiving device to thereby cause a continuation of the reduction of the pressure on said opposite side of the piston in response to reduction of the pressure in said device at a rate exceeding said certain rate so as to maintain a fluid pressure force active on said piston effective to maintain said valve device in its said different position, a second valve, movable abutment means subject to the pressure of the fluid in the said pressure receiving device, a spring active on said abutment in opposition to the pressure of the fluid acting on said abutment and effective to operate said second valve to a closed position when the pressure of the fluid in said receiving device reduces below a certain value, said second valve being effective in its closed position to terminate further reduction in the pressure of the fluid on said opposite side of said piston whereby to permit an increase of such pressure and a consequent restoration of the valve device to its said normal position.

4. Valve mechanism for controlling the supply of fluid under pressure to and the release of fluid under pressure from a fluid pressure receiving device, said valve mechanism comprising a fluid pressure differential operated valve device having a control chamber at one side thereof and operative in response to a momentary reduction of the pressure in said control chamber at a rate exceeding a certain rate from a normal position in which it establishes a communication through which fluid under pressure is supplied to the pressure receiving device to a second position closing the said supply communication and establishing a venting communication through which fluid under pressure is vented from said pressure receiving device at a rate exceeding said certain rate, valve means operative by the said valve device in its traverse to its said second position for establishing a connection between said control chamber and the receiving device and thereby causing the pressure of the fluid in said control chamber to continue to reduce at a rate exceeding said certain rate corresponding to the rate of reduction of the pressure in said receiving device notwithstanding cessation of the initial momentary reduction of pressure in the control chamber, and pressure actuated valve means responsive to a reduction of the pressure in said receiving device to below a certain value for terminating further reduction of the pressure in the control chamber and causing an increase of the pressure in said control chamber effective to restore the valve device to its said normal position.

JOSEPH C. McCUNE.